Patented Jan. 29, 1952

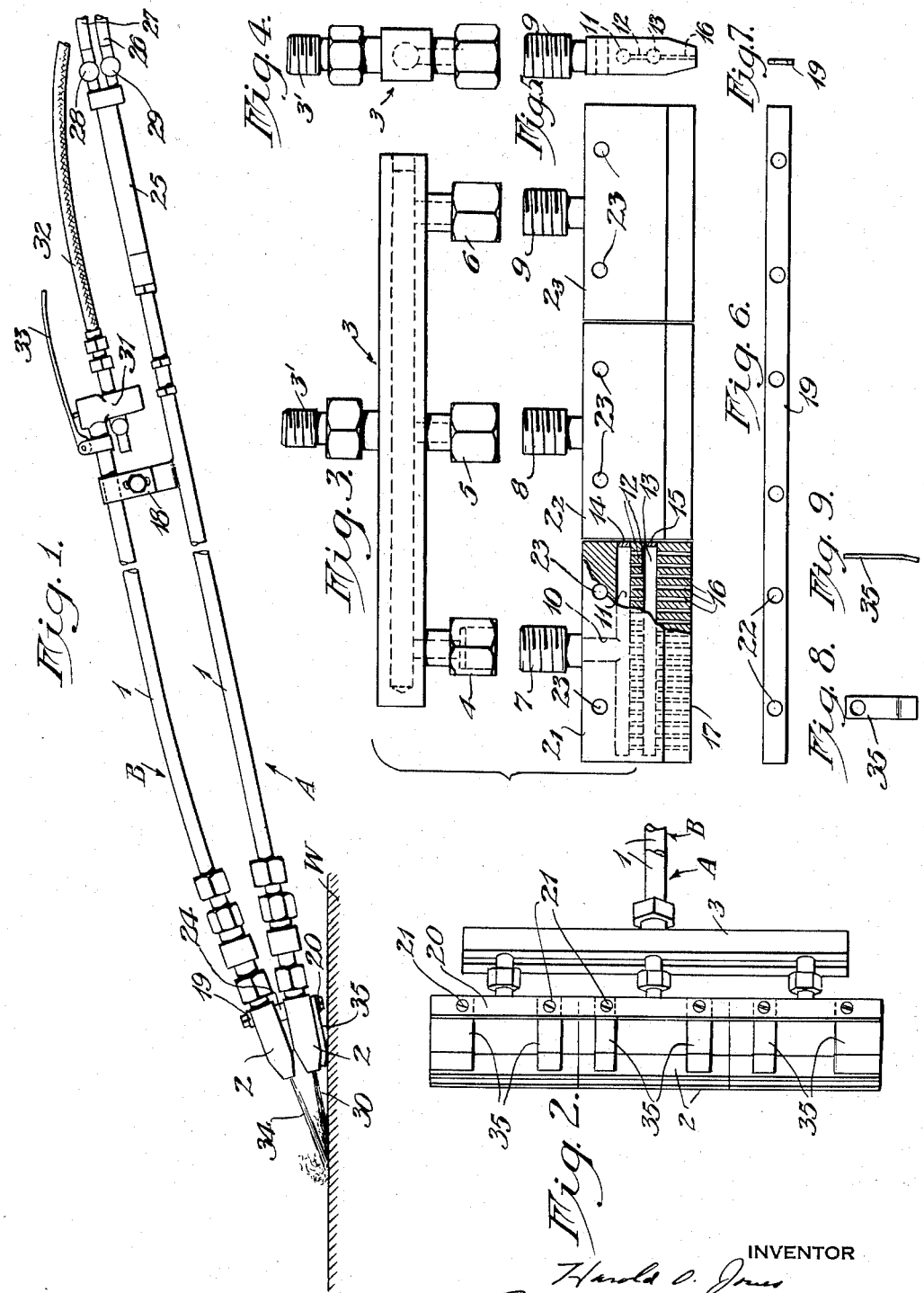

2,583,779

UNITED STATES PATENT OFFICE 2,583,779

METHOD OF REMOVING PAINT

Harold O. Jones, Pleasantville, N. Y., assignor to Air Reduction Company, Incorporated, a corporation of New York Application February 7, 1946, Serial No. 646,128

2 Claims. (Cl. 134—2)

This invention relates to a method for burning old paint from painted metal surfaces.

A method that is extensively used to remove paint from metal surfaces of relatively large area, such as the surfaces of steel structures and metal plates, is to burn it off with an oxyacetylene torch. A so-called descaling or flame-cleaning torch is usually used for the purpose. The oxyacetylene flames apply intense heat to the paint and burn it to an ash as the torch tip is moved progressively over the work. The ash residue usually adheres to the surface, but can be removed with a wire brush. In some cases the old paint is difficult to remove even with the intense heat of the oxyacetylene flames, and several passes of the torch over the surface may be required. This is particularly true where the paint to be removed has been applied in a large number of coats because not more than two coats can ordinarily be taken off by the torch in one pass. Moreover, it is usually necessary to use a wire brush on the surface after one pass before the underlying coats of paint can be removed by a subsequent pass.

I have discovered that if the oxyacetylene flames are supplemented by a separate stream of oxygen directed against the old paint immediately adjacent the region where the flames come in contact with it, considerable time can be saved in removing the old paint, because no matter how difficult the old paint may be to remove or how many coats there may be, the paint is burned almost completely in one pass of the torch over the surface and subsequent scraping or cleaning of the surface with a wire brush is reduced to a minimum. The improved method in its broader aspects therefore comprises progressively heating the old paint to kindling temperature, preferably by an oxyacetylene flame system, and while the old paint is at kindling temperature, directing a stream of oxygen against it to substantially completely reduce the paint to a loosely adhering, non-combustible ash by thermochemical action.

The principal objects of the invention are therefore to provide a more efficient method of burning old paint from metal surfaces and an improved type of oxyacetylene hand torch adapted to be used for removing old paint by the improved method.

The method and a torch for carrying out the method are illustrated in the accompanying drawing, in which:

Figure 1 is a side elevation of the torch;

Fig. 2 is a plan view of the torch tip assembly as viewed from the work-contacting side;

Fig. 3 is a disassembled plan view of the individual tip blocks, which together make up one of the composite tips of the torch, and the header for supplying gas to the individual tip blocks;

Fig. 4 is an end view of the header shown in Fig. 3;

Fig. 5 is an end view of one of the tip blocks shown in Fig. 3; and

Figs. 6 to 9, inclusive, are detail views; Figs. 6 and 7 being respectively a plan view and an end view of one of the clamping strips for the several tip blocks that make up a composite tip; and Figs. 8 and 9 being respectively a plan view and side elevation of one of the work-contacting shoes or skids.

The torch is a composite one made up of two individual similar torch units clamped together as hereinafter described, one being a heating torch unit supplied with a combustible gas mixture which feeds heating flames for raising the old paint to kindling temperature, and the other being an oxygen torch unit supplied with oxygen which is projected against the old paint while it is raised to kindling temperature by the heating flames. Each torch unit, structurally considered, is preferably like a conventional descaling or flame-cleaning torch and has a gas-conducting handle portion connected at its lower end to a flat block-type tip of the kind usually employed for descaling or flame-cleaning flat surfaces. In Fig. 1 the heating torch unit is shown at A and the oxygen torch unit is shown at B. Each torch unit has a gas pipe 1 which constitutes a handle portion. The pipe 1 delivers gas to a tip 2 of the flat elongated block type whose major axis is at right angles to the axis of the pipe 1. To give the tip greater width and thus enable it to operate on a wider area as the tip is moved forward over the work surface, the tip is preferably a composite one, made up in the usual way of a number of individual tip blocks positioned in end-to-end relation. Three of such individual tip blocks $2_1$, $2_2$ and $2_3$ are shown in Fig. 3. A gas header 3, shown disassembled from the individual tip blocks in Fig. 3, is connected at its inlet 3' to the lower end of the gas pipe 1. The header has three outlets 4, 5 and 6 adapted to be connected respectively to inlets 7, 8 and 9 on the individual tip blocks.

As shown in Fig. 3 the gas enters each tip block through a passage 10 in the block and is delivered to a gas distributing chamber 11 extending longitudinally of the block whence it passes through a row of metering ports 12 into a second distributing chamber 13. The two distributing chambers 11 and 13 are formed by drilling longitudinal bores into the block from one of its ends and then plugging the open end of each bore as shown at 14 and 15. From the distributing chamber 13 the gas passes through a row of jet passages 16 terminating in a row of discharge orifices in the discharge face 17 of the block.

The two torch units are assembled as shown in Fig. 1 so that one torch tip overlies the other and the two torch units are then clamped together. A clamp 18, which may be adjustable if desired, clamps the two gas pipes in spaced relation as shown, and the two composite tips are clamped together between longitudinally extending clamping strips 19 and 20 one of which extends longitudinally along the outer face of one composite tip and the other of which extends longitudinally along the outer face of the other composite tip. One of these clamping strips is shown in Figs. 6 and 7. Bolts 21 (Figs. 1 and 2) pass through bolt holes 22 in the clamping strips (Fig. 6) and through bolt holes 23 in the individual tip blocks and hold the individual blocks of each composite tip in alignment and also clamp the two composite tips together. Preferably, a spacer 24 (Fig. 1) is inserted between the two composite tips to space the row of discharge orifices in one tip the proper distance from those in the other tip.

The upper end of the gas pipe of the heating torch unit A is connected to a gas mixer 25 (Fig. 1). Oxygen, and a fuel-gas such as acetylene, are supplied to the mixer by means of flexible hoses 26 and 27, the usual valves 28 and 29 being provided at the inlet end of the mixer whereby the oxygen and fuel-gas can be supplied to the mixer in the proper proportion. The gas mixture issues from the discharge orifices in the tip of the corresponding torch unit, and when ignited, produces a row of flame jets represented at 30. To the upper end of the gas pipe of the oxygen torch unit B there is connected a quick-acting oxygen control valve of conventional type shown at 31. Oxygen is supplied to the valve through a flexible hose 32, and when the handle 33 of the oxygen valve is depressed, oxygen issues as a row of jets 34 from the corresponding torch tip.

The clamping means for the torch units so clamps them together that their longitudinal axes are at an acute angle as shown at Fig. 1 to cause the flame jets and the oxygen jets to converge so that the oxygen jets will strike the work surface immediately adjacent the region where the flames come in contact with it, i. e. to cause the oxygen and flame jets to impinge upon approximately the same area of the surface.

The torch tip which is to be adjacent the work surface when the torch is being used, for instance the tip of the heating torch unit A, may have associated with it a number of wear-resistant skids or shoes 35 (Figs. 1 and 2) adapted to contact with the work surface and support the two torch tips in proper relation to it when the torch is moved over the surface. One of these shoes is shown by itself in Figs. 8 and 9. They may comprise strips of wear-resistant metal each of which is attached to the tip of the heating torch unit A so that this tip rests on the shoes when the torch is in use, as shown in Fig. 1. The shoes may be conveniently held in place by the clamping strips 19 and 20 and the bolts which clamp the two composite torch tips together.

In use, the gas mixture issuing from the heating torch unit A is ignited to produce a row of flame jets and the operator then holds the torch so that the shoes of the heating torch unit are in contact with the surface of the work. As soon as the old paint has been brought to kindling temperature, which is almost instantly, the operator depresses the handle 33 of the oxygen control valve to turn on the supply of oxygen to the oxygen torch unit. The torches are then moved over the surface of the work either with a steady forward progression, or with a reciprocating action having a net forward progression.

The oxygen impinging on the old paint which has been brought to kindling temperature by the heating flames causes the paint to be almost completely consumed in one pass of the torch, no matter how many coats of old paint there may be or how difficult the old paint would be to remove by the usual procedure. Experience has shown that from 60% to 80% more of the paint is burned by the method of the invention than by the use of oxyacetylene descaling or flame-cleaning torches having no separate oxygen jets directed against the paint. One use to which the invention has been put, and which shows the effectiveness of the method and apparatus, is for removing paint from the front ends of locomotives. This is a particularly severe test because such paint is greasy and dirty and the metal on the front end of a locomotive gets so hot in service that the paint is baked on.

While the block type torch tips herein shown and described are of the multi-jet type, they could if desired have slot-type discharge orifices to produce sheet-type jets, particularly in the case of the heating torch.

I claim:

1. The method of removing old burnable paint from painted metal surfaces which comprises directing a row of flame jets against the painted surface in a direction substantially at right angles to the direction in which the row of flame jets extends, simultaneously directing a parallel row of oxygen jets against the painted surface in a direction substantially at right angles to the direction in which the row of oxygen jets extends and in converging relation to the flame jets so that they impinge on substantially the same area of the painted surface as the flame jets, the oxygen jets being also directed at an acute angle against the painted surface, and simultaneously moving the flame jets and oxygen jets over the painted surface to progressively remove the old paint from the surface by a combined heating, oxidizing and skimming action.

2. A method of removing burnable paint from a metal surface comprising applying high temperature heating flames to a localized portion of said surface to raise the temperature of the paint on said portion to its ignition temperature, advancing said flames over said surface to progressively heat adjacent portions of said paint, and progressively applying jets of gaseous oxygen to said paint while said paint is at its ignition temperature to substantially completely reduce said paint to a loosely adhering, noncombustible ash by thermochemical action.

HAROLD O. JONES.

REFERENCES CITED

The following references are of record in the file of this patent:

UNITED STATES PATENTS

| Number | Name | Date |
|---|---|---|
| 934,514 | Fitzsimmons | Sept. 21, 1909 |
| 1,901,803 | Davis | Mar. 14, 1933 |
| 2,252,320 | Hughey | Aug. 12, 1941 |
| 2,277,472 | Anderson | Mar. 24, 1942 |
| 2,282,397 | Deck | May 12, 1942 |
| 2,356,197 | Jones et al. | Aug. 22, 1944 |

FOREIGN PATENTS

| Number | Country | Date |
|---|---|---|
| 617,145 | France | Feb. 14, 1927 |
| 438,382 | Great Britain | Nov. 15, 1935 |